J. A. Smith & S. E. Pettee. Sheet 1. 2 Sheets.

Paper Bag & Envelope Mach.

No. 705. Reissued May 26. 1859.

J. A. Smith & S. E. Pettee. Sheet 2. 2 Sheets.

Paper Bag & Envelope Mach.

No. 705. Reissued Apr. 26. 1859.

UNITED STATES PATENT OFFICE.

NORTH AMERICAN PAPER BAG AND ENVELOPE MANUFACTURING COMPANY, OF PHILADELPHIA, PENNSYLVANIA, ASSIGNEES OF J. A. SMITH, OF CLINTON, AND S. E. PETTEE, OF FOXBOROUGH, MASSACHUSETTS.

MACHINE FOR MAKING PAPER BAGS AND ENVELOPES.

Specification forming part of Letters Patent No. 12,786, dated May 1, 1855; Reissue No. 705, dated April 26, 1859.

*To all whom it may concern:*

Be it known that JOHN A. SMITH, of Clinton, in the county of Worcester, and S. E. PETTEE, of Foxborough, in the county of Norfolk, both in the State of Massachusetts, did invent certain new and useful Improvements in Machines for Folding and Pasting Paper Bags and Envelopes and for Feeding the Same; and we do hereby declare that the following is a full and exact description of the construction and operation of the same, reference being had to the drawings herewith presented, and to the letters of reference marked thereon.

Figure 13:
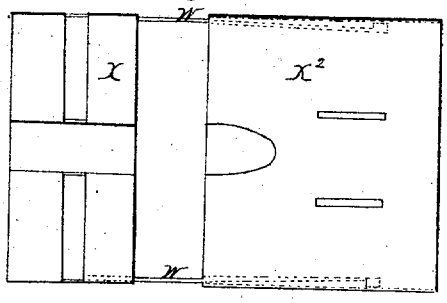
Figure 15:
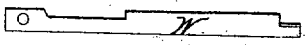
Figure 16:
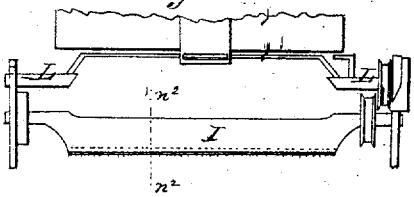
Figure 5:
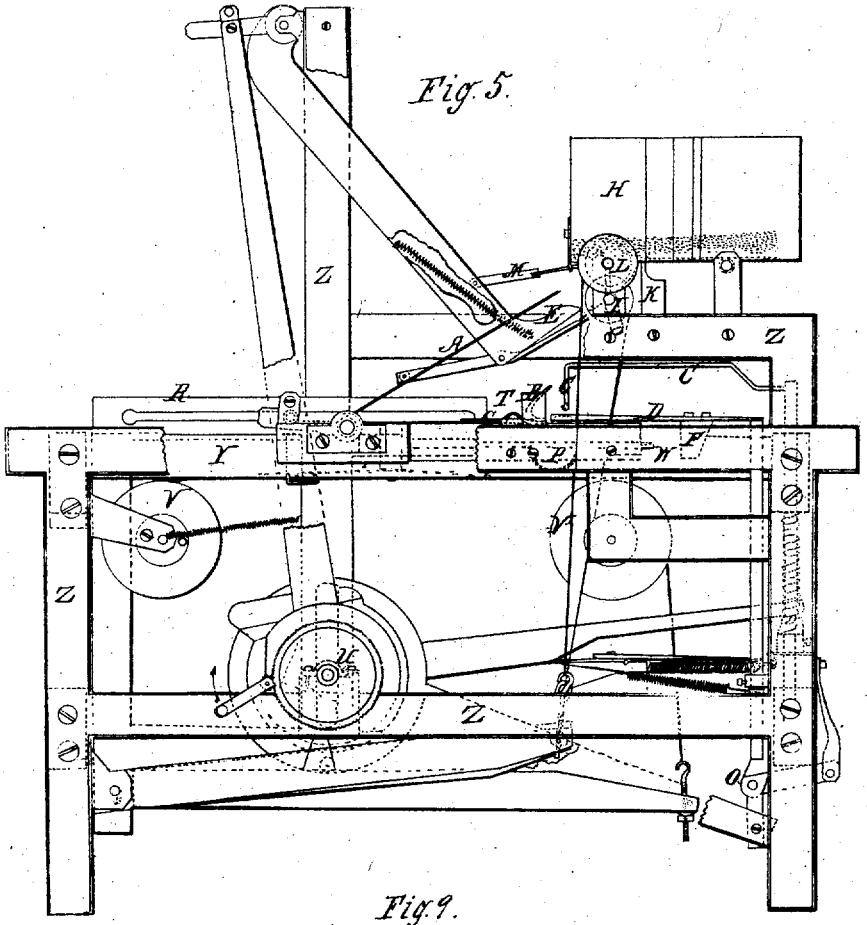
Figure 9:
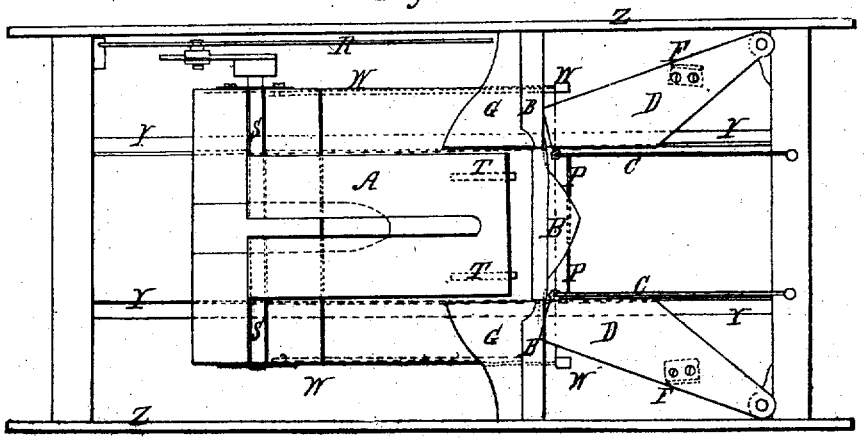

The principles of the machine may be illustrated as follows, to enable any person skilled in the art to make one: Make a frame, Z Z, (see drawings, Figure 5); place the slides Y Y lengthwise between the girths, near the top. On the slides fit the table $x$ $x^2$, Fig. 13, so as to slide freely, but not to be lifted off the slides. The table we make in two parts, $x$ and $x^2$, (see Fig. 13,) and connect them together by the springs W W, which hold them together, and, when cast off at the ends, allow them to separate only the width of the envelope. This will vary for different sizes. The part $x$ we connect to a strap or belt passing over the rolls V V, and attached to them, one of which receives motion from a lever operated by a cam on shaft U. The other contains a spring to draw back the table, (or a weight may be used for the same purpose.) The part $x$ is made with a groove lengthwise for the jaws E to play through, and $x^2$ is partly cut away for the same purpose, and is provided with two springs, T T, playing through slots in it. To the part $x$ attach two bearings for shaft S, which is made crooked to allow room for the jaws E to pass it, and to one end is attached a lever, moved vertically by frame K, but free to slide horizontally with the table, the frame K receiving its motion from a cam on shaft U. To the shaft S attach the former A, of any required size, made of thin metal, with its edges made thin and smooth, and very slightly tapering toward the end, and having a slot just wide enough to allow the jaws to play freely nearly its whole length. This former is the pattern of the width we wish to make the bags, as its width (when the machine is used for making envelopes) is the length of the envelope required, and will be varied for the different sizes. Above the table place the bar B so that the former may pass under it when pressed down to the table, and the bar B serve to hold the folded paper smooth on the former A, while the side-folders D D fold and press the sides on. The folders D D are hung on rods, and swing over the former A, the rods being connected by a lever and connecting-rod to a cam on shaft U. The folders D D have their edges nearest the former A slightly turned up to insure their passing over the former A, while they are placed low enough to press the paper on the former A when moved on. To the side-folders D D attach the pieces F F, to operate or cast off the springs W W. The pasters C C are attached to rods having levers and connecting-rod to cam on shaft U, to give them an outward motion, and have springs to press them down on the work, and are connected to tumbler shaft O, which receives its motion through a connecting-rod to cam on shaft U, and holds the sponges or brushes attached to the ends of the pasters at the right height to spread the paste or gum on the paper, when it passes under them, allowing the spring to throw them down into the paste-trough P, placed between the slides Y Y, a little below the range of the table. To the sides of the frame attach the guards G G, extending over the table to near the former A, and the side-folders D D to guide the sides of the paper over D D. The jaws E are made so as to insert in one a piece of wood to hold fine needle-points and a spring to keep them closed, and the other with recesses to clear the points, or not hit them, and is extended back to receive a friction-roll, to be operated by the former A, and having also small projections on the fore part extending wider than the slot in A, so that when it is closed onto them it shall open the jaws and press the paper off the points. The jaws are hung by the upper part to a shaft hung in the upright part of the frame Z, having a lever and connecting-rod to cam on shaft U. To the jaw E attach the lifter M, working through a guide on box H. The box H, for holding the pile of paper, is supported on pivots a little back of the center, the fore part resting on the bar L. The bottom of H is partly removed, leaving a narrow edge in front for the end of the paper to rest on, and open back far enough to make room for bar K, the box being made to conform to the size and shape of the paper used, so as to keep the sheets even and square. The form shown will serve for an envelope and bag, the length of the envelope being equal to the width of the bag, and the length of the bag equal to twice the width of the envelope. The friction bar I is made so as to insert into it a slip of wood, in which are a set of fine points, and is hung so as to play against the paper behind the lip of box H. It receives motion from a lever operated by a cam on shaft U, and provided with a spring to return it to place. The guide-bar L is placed above the bar I, and is made crooked to allow the bar I to pass it when at rest near the edge of box H. It has a stud to lift the fore part of box H when the bar L is turned up, and may be operated by similar means as bar I, and is so placed as to form, when turned down, a guide, with bar I to hold the end of the paper in position for the jaws E to take it. The bar K is placed so as to project a little above the bottom of the box H, when the front part is lowered by bar L to partially sustain the weight of the pile of paper and relieve the end of the under sheet, so as to allow it to be slid by bar I. The cams and levers mentioned it is not thought necessary to describe minutely, they being parts which every mechanic would wish to make according to the kind of work intended to be made, the drawings representing only the arrangement and form adapted to one size of envelope and bag.

Figure 6:
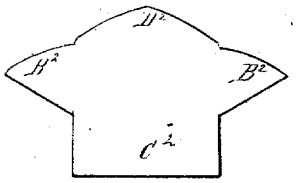
Figure 7:
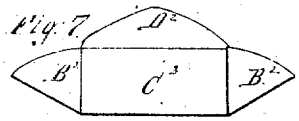
Figure 8:
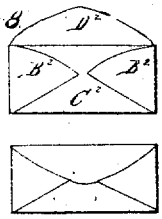
Figure 14:
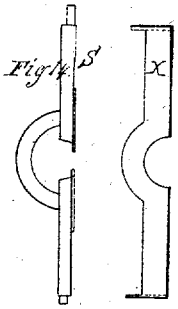
Figure 1:
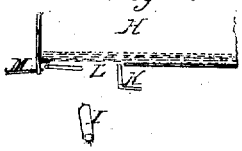
Figure 2:
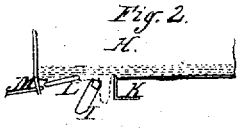
Figure 3:
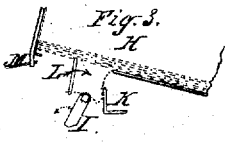
Figure 4:
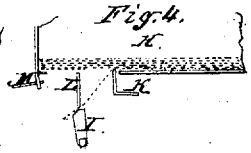
Figure 17:
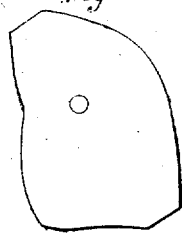
Figure 10:
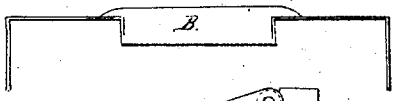
Figure 11:
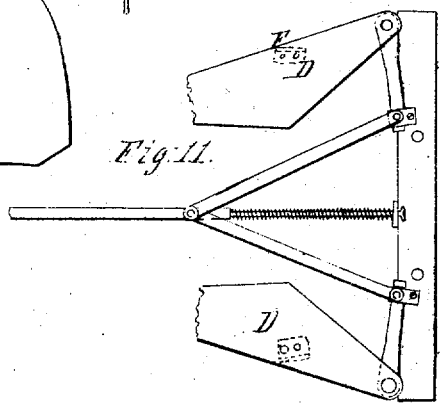
Figure 12:
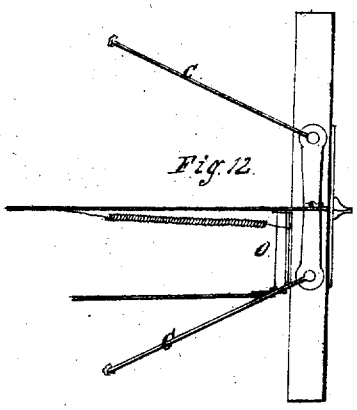

The operation of the machine: The paper cut into the proper form is placed in the box H and paste or gum is put into the trough P, and motion is given to shaft U, (the bars I and L being in the position shown in Fig. 1.) The bar I turns up over in the direction shown by the arrow, Fig. 1, and after it passes the bar L the box is lowered a little, to allow the bar K to take the weight of the pile partly off the end of the under sheet, and to enable the bar I to draw or slide back the under sheet, as shown in Fig. 2. The bar L, then following, lifts the box and paper away from it, and the bar L passes over the end of the sheet, as shown in Fig. 3. The bar I then returns to its former position, and the bar L, continuing its motion, brings the paper between them, as shown in Fig. 4, ready for the jaws E to take it. This part of the operation is performed while the machine is finishing one bag or envelope for another, or so as to have another ready. As the one just finished is delivered, the table moves back far enough to allow the former A to be lifted. It then moves forward, as also do the jaws E, carrying the lifter M into the box H, lifting the weight off the under sheet, to allow it to be drawn out without disturbing the others, the former A lifting enough to clear the fore part of the jaws, and to open them by pressing against the roll on the back end of the lower part, keeping them open until they pass over the paper, the jaws stopping. The former A, by moving a little farther, or dropping a little, allows the spring to close the jaws on the paper. The jaws, now moving back, draw the paper out of the box H, the bar L turning a little to be out of its way, and afterward turning to place in time for bar I to pass it to take another sheet. The table, moving back with the jaws, receives the paper, and the former A is closed on the paper, with its edges in the proper position for the folds, and the part $C^2$, Fig. 6, of the paper lying on the bar B, and the sides $B^2$ $B^2$ lying on the guards G G. The former A, pressing the lower jaw down, removes the paper from the points in the upper one. The table $x$ now moves forward, carrying the former A under the bar B, thereby folding the part $C^2$ as in Fig. 7, the guards G G guiding the sides $B^2$ $B^2$ over the folders D D and under the sponges or pasters, which, having been dipped into the paste while the table was receiving the sheet, pass outward, as the paper passes under them, so to spread the paste or gum along the straight edges of $B^2$ $B^2$. The side-folders D D now move on simultaneously, while the part $R^2$ is held smooth by bar B, as in Fig. 8, and press the sides on. The pieces F F casting off the springs W W, the part $x$ of the table moves back, the folders D D holding the paper onto $x^2$, and when the former A is drawn out the width of the envelope, or so as to cover only $D^2$, the whole table moves back, carrying the folded back beyond the bar B, when the springs T T lift it, and, the table moving forward, again, it is folded over the former A and lap $D^2$, finishing the envelope. The table, moving far enough forward to bring the whole work by the bar B, delivers the work on its return, the bar B serving to hold it while the table is moved back for another sheet. The springs T T, in passing under the bar B, are pressed down sufficiently to allow the former A to slide over them, allowing the parts $x$ and $x^2$ to come together before they get clear forward. The finished work, falling onto the band over the roll V, slides into any receptacle that may be placed for it. This is the operation to make envelopes, and by removing some parts and altering the motion of the table we adapt the same machine to the making of bags. This is done as follows: Remove the pieces F F from the folders D D and the connection of the pasters to the cam, which gives them their outward motion, and set the sponges or brushes so as to stand over the edge of the paper as it passes out from under the bar B. This may be done by using a small bolt and nut in the notches in the levers in place of the connecting-rod, and fastening the levers together, which will prevent their moving sidewise. The cam which moves the table being removed, and the one shown in Fig. 17 substituted, the machine is prepared to make bags. The paper (being cut according to the pattern) is placed in the box H. The operation is the same, excepting that the table, after moving forward, and the sides being folded, does not separate, but as the side folders return to their place moves farther forward to deliver the bag finished, and then returns to be ready for another sheet.

It is very evident that the principles of construction herein before laid down may be used in a variety of ways or forms and arrangements of parts, some of which we proceed to mention. The side-folders may be made to slide straight on, instead of swinging, and the bars B and K be movable; or the bars I and L may be hung to the box H, or the whole feeding apparatus be used to feed other machines, and the raising or lifting folders used to fold on the former A without the bar B, and the friction-bar I may be made without the points mentioned by using dogfish or shark skin, or even sand or emery paper, or some slightly-sticky substance, to enable it to move the under sheet. The jaws E admit of the same variations; or two jaws working at the sides of the former A may, perhaps, be better for bags. The former also may be of any length or shape required, and may be made without a slit, if preferred. These, with many other variations, would be only using our invention, or a part of it, as we do not claim the exact form or arrangement of any of the parts, but only the following points:

We claim—

1. The bar K, to relieve the end of the under sheet of the weight of the pile, partially or wholly.

2. The friction-bar I, to separate the under sheet.

3. The guide bar L, in connection with bar I, to hold the sheet in place for the jaws.

4. The lifter M, to relieve the sheet from the weight of the pile.

5. The feeding from the bottom of the pile.

6. The combination of the weight-bar, friction-bar, guide bar, and lifter, constituting a feeding apparatus.

7. The jaws, to place the paper in position.

8. In combination with machinery for making bags from paper of any size, a former, of the shape and dimensions required by the nature of the work to be done, over or around which the paper is to be folded for the purpose of producing the bag or bags, substantially as described. We wish it understood, however, that we distinctly disclaim the use of a series of molds in a machine for making paper boxes, such a series having been used in a paper-box machine of R. L. Hawes, patented January 16, 1855. Nor do we claim molds placed at the extremities of the arms of a wheel, and used in the manufacture of paper boxes, such an arrangement having been employed in the box-machine of Louis Koch, patented March 13, 1855.

9. The pasters and side-folders.

10. The combination of the table, the bar B, the side-folders, and pasters, all constructed as herein set forth, or any other substantially the same.

In testimony that the above is a correct specification of the said invention we have hereunto set our hands this 14th day of March, 1859.

JOHN H. LEWARS,
*President.*

CHAS. C. BERGMANN,
*Secretary and Treasurer.*

Witnesses:
EDWD. VEUMAN,
CHARLES C. OAT.